United States Patent
Wang et al.

(10) Patent No.: US 10,825,466 B2
(45) Date of Patent: Nov. 3, 2020

(54) BLIND SIGNAL SEPARATION METHOD AND STRUCTURE, VOICE CONTROL SYSTEM, AND ELECTRICAL APPLIANCE ASSEMBLY

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Yan Wang, Anhui (CN); Hailei Chen, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 16/338,198

(22) PCT Filed: Sep. 26, 2017

(86) PCT No.: PCT/CN2017/103517
§ 371 (c)(1),
(2) Date: Mar. 29, 2019

(87) PCT Pub. No.: WO2018/059406
PCT Pub. Date: Apr. 5, 2018

(65) Prior Publication Data
US 2020/0027473 A1    Jan. 23, 2020

(30) Foreign Application Priority Data

Sep. 29, 2016    (CN) .......................... 2016 1 0866508

(51) Int. Cl.
*G10L 21/0308* (2013.01)
*G10L 15/20* (2006.01)
*G10L 21/0216* (2013.01)
*G10L 21/028* (2013.01)

(52) U.S. Cl.
CPC .......... *G10L 21/0308* (2013.01); *G10L 15/20* (2013.01); *G10L 21/028* (2013.01); *G10L 21/0216* (2013.01)

(58) Field of Classification Search
CPC ............. G10L 21/0272; G10L 21/0308; G10L 21/0216; G10L 15/20; G10L 21/028; G10L 19/00; G10L 2021/02163
See application file for complete search history.

(56) References Cited

U.S. PATENT DOCUMENTS

2007/0133811 A1    6/2007  Hashimoto et al.
2009/0222262 A1*   9/2009  Kim .................... G10L 21/0272
                                          704/231

FOREIGN PATENT DOCUMENTS

CN    101833955 A    9/2010
CN    104064186 A    9/2014
JP    2005-518572 A  6/2005

OTHER PUBLICATIONS

Zhao et al. ("An Effective Method on Blind Speech Separation in Strong Noisy Environment"), May 28-30, 2005, IEEE Int. Workshop VLSI Design & Video Tech. https://ieeexplore.ieee.org/stamp/stamp.jsp?tp=&arnumber=1504588 (Year: 2005).*

(Continued)

*Primary Examiner* — Yogeshkumar Patel
(74) *Attorney, Agent, or Firm* — Seed IP Law Group LLP

(57) ABSTRACT

A blind signal separation method includes: performing noise reduction preprocessing on a detected voice signal, wherein the voice signal is a linear superposition signal of a plurality of simultaneous signal source voice messages; constructing, by means of non-Gaussian measurement, a target function (Continued)

for the preprocessed voice signal; estimating, by means of an iterative algorithm, an expectation-maximization separation matrix W of the target function; and deriving an estimated target separation signal U(n) from U(n)=WX(n), wherein X(n) is a vector constructed by the plurality of signal source voice messages.

15 Claims, 3 Drawing Sheets

(56) References Cited

OTHER PUBLICATIONS

Hyvärinen (Fast and Robust Fixed-Point Algorithms for Independent Component Analysis), May 3, 1999, IEEE Transactions on Neural Networks, vol. 10 https://ieeexplore.ieee.org/stamp/stamp.jsp?tp=&arnumber=761722 (Year: 1999).*

Chinese Office Action dated Dec. 20, 2018, for Chinese Application No. 201610866508.9, 9 pages. (With English Translation).

International Search Report dated Dec. 29, 2017, for International Application No. PCT/CN2017/103517, 8 pages. (With English Translation).

Ji, "Application of ICA in signal separation and noise cancellation," *China Academic Journal Electronic Publishing House* 124(12):28-29, 2009. (3 pages) (With English Abstract).

Yan, "Application of Improved Independent Component Analysis Technology in Speech Signal Separation," *Electronic Sci. & Tech* 10847:83-87, 2019. (With English Abstract).

Hyvärinen et al., *Independent Component Analysis*, John Wiley & Sons, Inc., 2001, pp. 164-179 and 202-217.

Handa et al., "Separation of mixed speech signals of short duration using Wiener filter as postprocessing for Frequency-Domain ICA," *Sinc(i)*, vol. 2006, No. 12:1-6, 2006.

* cited by examiner

BLIND SIGNAL SEPARATION METHOD AND STRUCTURE, VOICE CONTROL SYSTEM, AND ELECTRICAL APPLIANCE ASSEMBLY

CROSS-REFERENCE

The present application claims priority to Chinese Patent Application No. 201610866508.9, filed on Sep. 29, 2016, entitled "Blind Signal Separation Method and Structure, Voice Control System, and Electrical Appliance Assembly", the disclosure of which is incorporated herein by reference in its entirety.

FIELD OF TECHNOLOGY

The present application relates to the field of voice control, and specifically to a blind signal separation method and structure, a voice control system, and an electrical appliance assembly.

BACKGROUND

At present, with the development of integrated circuits, artificial intelligence, and Internet technologies, the traditional white goods industry has been placed in a new position, and intelligentization has become a trend. For intelligent home appliances, voice control has become a new control method that various manufacturers are actively trying in addition to the traditional control functions. A voice control system achieves intelligent control by detecting the sound in the room, obtaining the voice control instruction therein after processing, and executing the voice control instruction with home appliances.

However, in a real application environment, there are usually large noises in the working environment of the home appliances, and the detected indoor sound often includes the sound made by the speaker, the voice of the non-voice instructor, the voice of the voice instructor, the environmental noise, and so on. For the traditional recording methods, the collected signal has much interference, and direct processing will have a great impact on the recognition rate of the voice, and inaccurate recognitions are also prone to occur.

SUMMARY

(I) Technical Problem to be Solved

The present application aims to provide a blind signal separation method and structure, a voice control system, and an electrical appliance assembly, so as to solve the problems of much interference, inaccurate recognition and low efficiency of the existing voice recognition.

(II) Technical Solutions

In order to solve the technical problems above, the present application provides a blind signal separation method, including:

a preprocessing step for performing noise reduction preprocessing on a detected voice signal, wherein the voice signal is a linear superposition signal of a plurality of simultaneous signal source voice messages;

a constructing step for constructing, by means of non-Gaussian measurement, a target function for the preprocessed voice signal;

an estimating step for estimating, by means of an iterative algorithm, an expectation-maximization separation matrix W of the target function; and a deriving step for deriving an estimated target separation signal $U(n)$ from $U(n)=WX(n)$, wherein $X(n)$ is a vector constructed by the plurality of signal source voice messages.

In some embodiments, the preprocessing step includes data centralization, wherein a formula of the data centralization is:

$Y=X-\text{mean}(X)$, wherein X is input data, mean(X) is a mean value of X; Y is centralized data, and an expectation of the mean value thereof is 0.

In some embodiments, the preprocessing step includes whitening, wherein a formula of the whitening is: $Z(t)=W_0X(t)$, wherein $W_0$ is a whitening matrix and Z is a whitening vector.

In some embodiments, the target function is a negative entropy function, and a formula of the negative entropy function is:

$N_g(Z)=H(Z_{Gauss})-H(Z)$, wherein $Z_{Gauss}$ is a Gaussian random variable with a same variance as that of Z, H(.) is a differential entropy of the random variable, and $N_g(Z)=0$ when Z is a Gaussian distribution;

a probability distribution of Z is $[E\{G(z)\}-E\{G(v)\}]^2$, wherein v is a quasi-Gaussian random variable, G is a non-quadratic function of even function with a convex property, wherein $$G(u) = \frac{1}{a}\log(\cosh(az)),$$

and u is a variable.

In some embodiments, the estimating step includes:

an evaluating step for estimating number m of components to be estimated;

an initializing step for initializing weight vector w;

a calculating step for calculating $W_p$ with $W_p=E\{Zg(W_p^TZ)\}-E\{g'(W_p^TZ)\}$;

a determining step for determining whether $W_p$ converges with $W_p=W_p/\|W_p\|$;

de-correlating $W_p$ when $W_p$ converges;

letting $p=p+1$, comparing p with m, when $p<m$, the process returns to the initializing step; when $p \geq m$, the process ends and the separation matrix W is obtained.

In some embodiments, de-correlating $W_p$ includes:

after estimating p vectors $W_1, W_2, W_3, W_4, \ldots W_p$, subtracting the projections $W_{p+1}^TW_j$, $j=1,\ldots,p$ of p vectors when estimating $W_{p+1}$, then standardizing $W_{p+1}$.

In some embodiments, the process returns to the calculating step when $W_p$ does not converge.

In another aspect, the present application also provides a blind signal separation structure for implementing the blind signal separation method above, including:

a preprocessing module, configured to perform noise reduction preprocessing on a detected voice signal, wherein the voice signal is a linear superposition signal of a plurality of simultaneous signal source voice messages;

a constructing module, configured to construct, by means of non-Gaussian measurement, a target function for the preprocessed voice signal;

an estimating module, configured to estimate, by means of an iterative algorithm, an expectation-maximization separation matrix W of the target function; and a deriving module, configured to derive an estimated target separation signal U(n) from U(n)=WX(n), wherein X(n) is a vector constructed by the plurality of signal source voice messages.

In some embodiments, the preprocessing module includes a data centralizing unit configured to perform data centralization, wherein a formula of the data centralization is:

Y=X−mean(X), wherein X is input data, mean(X) is a mean value of X; Y is centralized data, and an expectation of the mean value thereof is 0.

In some embodiments, the preprocessing module includes a whitening unit configured to perform whitening, wherein a formula of the whitening is: $Z(t)=W_0X(t)$, wherein $W_0$ is a whitening matrix and Z is a whitening vector.

In some embodiments, the estimating module includes:

an estimating unit configured to estimate number m of components to be estimated;

an initializing unit configured to initialize weight vector w;

a calculating unit configured to calculate $W_p$ with $W_p=E\{Zg(W_p^TZ)\}-E\{g'(W_p^TZ)\}$;

a determining unit configured to determine whether $W_p$ converges according to $W_p=W_p/\|W_p\|$; activate a de-correlating unit to de-correlate $W_p$ when $W_p$ converges, and let p=p+1; compare p with m, and return the process to the initializing unit when p<m, and ends the process when p≥m, and the separation matrix W is obtained;

activate the calculating unit when $W_p$ does not converge.

In some embodiments, de-correlating $W_p$ by the de-correlating unit includes:

after estimating p vectors $W_1$, $W_2$, $W_3$, $W_4$, . . . $W_p$, subtracting projections $W_{p+1}^TW_j$, j=1, . . . p of p vectors when estimating $W_{p+1}$, then standardizing $W_{p+1}$.

In another aspect, the present application also provides a voice control system, including a voice detecting assembly and the blind signal separation structure;

wherein the voice detecting assembly is configured to detect a plurality of signal source voice messages within environment and obtain voice signals for the blind signal separation structure to perform blind signal separation.

In another aspect, the present application also provides an electrical appliance assembly, including an electrical appliance and the voice control system, wherein the electrical appliance is connected to the voice control system.

In some embodiments, the electrical appliance assembly includes any of home appliances, central air conditioners, and electronic mobile terminals.

(III) Advantageous Effects

The technical solutions of the present application are for the noise interference in the working environment of the home appliances, which results the decrease of the voice recognition rate and affects the voice control function. For the actual working environment of the home appliances, the present application makes assumption of a linear instantaneous system, and proposes ICA-based blind source separation technology for a linear instantaneous mixing system, so as to achieve the noise reduction of the voice signals.

DESCRIPTION OF THE EMBODIMENTS

The specific implementations of the present application will be further described in detail hereinafter with reference to the accompanying drawings and embodiments.

The following examples are used to illustrate the present application, but are not intended to limit the scope thereof.

In the description of the present application, it should be noted that unless specifically defined or limited, the terms "mount", "connect to", and "connect with" should be understood in a broad sense. For example, they may be fixed connections or may be removable connections, or integral connections; they may be mechanical connections or electrical connections; they may also be direct connections or indirect connections through intermediate mediums, or may be an internal connection of two components.

In order to effectively extract the voice signal having voice instructions, the present application provides a blind signal separation method and structure, a voice control system, and an electrical appliance assembly.

Figure 2:
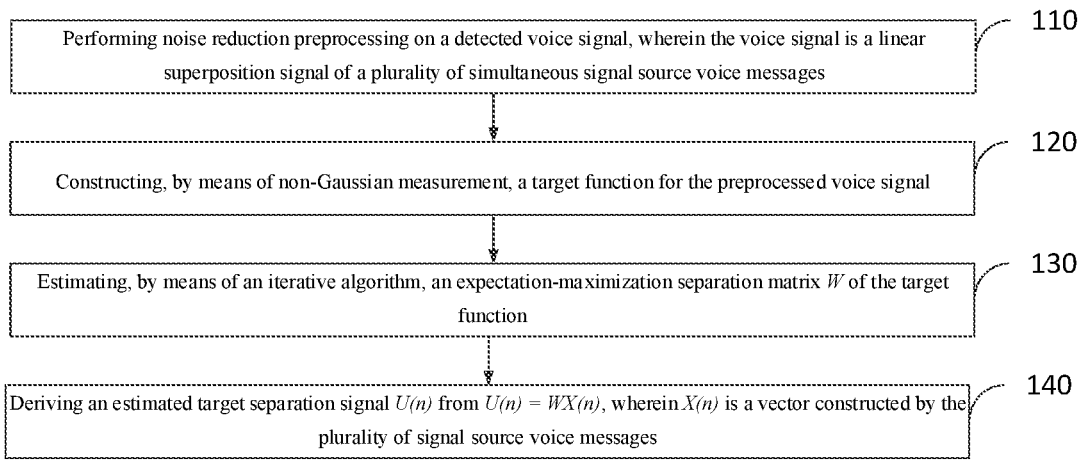
FIG. 2 is a flowchart of the blind signal separation method according to an embodiment of the present application.

The present application is described in detail hereinafter through basic designs, replacement designs and extended designs:

A blind signal separation method, as shown in FIG. 2, includes:

Step 110, performing noise reduction preprocessing on a detected voice signal, wherein the voice signal is a linear superposition signal of a plurality of simultaneous signal source voice messages;

Step 120, constructing, by means of non-Gaussian measurement, a target function for the preprocessed voice signal;

Step 130, estimating, by means of an iterative algorithm, an expectation-maximization separation matrix W of the target function; and Step 140, deriving an estimated target separation signal U(n) from U(n)=WX(n), wherein X(n) is a vector constructed by the plurality of signal source voice messages.

Before Step 110, Step 1110 may be further added:

Step 1110, using the plurality of signal source voice messages as the linear superposition signal.

The plurality of signal source voice messages are collected by a voice sensor.

Figure 1:
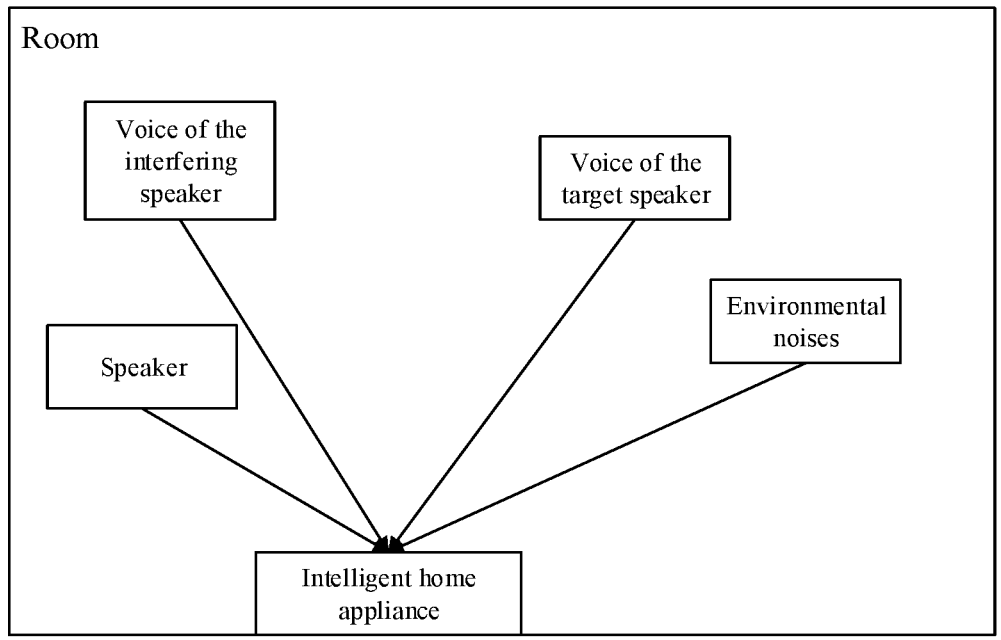
FIG. 1 is a diagram of the working environment of a refrigerator.

Taking a refrigerator as an example, the working environment of the refrigerator is as shown in FIG. 1. In the room, in addition to the voice of the voice instructor, there are environmental noises, the voice of a non-voice instructor, the sound that the speaker is broadcasting, etc.

Assuming that there are a plurality of signal sources $S_1(t)$, $S_2(t)$, $S_3(t)$, $S_4(t)$.

According to the working environment of home appliances, it can be assumed that it is a linear superposition between each sound source and the sensor, therefore the measurement signal can be expressed as:

$X_1(t)=a_{11}S_1(t)+a_{12}S_2(t)+a_{13}S_3(t)+a_{14}S_4(t)$ $X_2(t)=a_{21}S_1(t)+a_{22}S_2(t)+a_{23}S_3(t)+a_{24}S_4(t)$ $X_3(t)=a_{31}S_1(t)+a_{32}S_2(t)+a_{33}S_3(t)+a_{34}S_4(t)$ $X_4(t)=a_{41}S_1(t)+a_{42}S_2(t)+a_{43}S_3(t)+a_{44}S_4(t)$

A matrix representation of the general model of the output signal of the detected voice signal is obtained as:

$$X(t)=AS(t) \quad (1)$$

Figure 5:
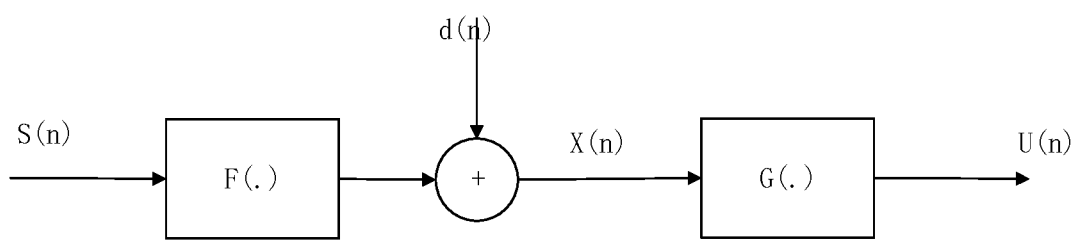
FIG. 5 is a model of the blind-source separation system used in an embodiment of the present application.

For a voice recognition system, among the detected signals, the useful signal is $S_1(t)$, and the detected signal is a superposition of various signals. And estimating the transformation matrix A and the signal S(t) that cannot be directly observed from the observation signal X(t) is the task of blind-source separation. A general model of the blind-source separation system is shown in FIG. 5. The measurement signal X(n) is a sequence composed by discrete values of the voice signals detected in the time sequence, and is a result of the mixture of the source signals, and the separated result U(n) is obtained through filter G.

In combination with the blind-source separation system model of FIG. 5, F(.) is generally a nonlinear source signal, and in this case, it is very difficult to restore the source signal. For a near-field voice signal, in the case that the time delay of the signal can be neglected, the linear instantaneous mixing system can be simplified. As shown in formula (1). The blind-source separation of the linear instantaneous mixing system is a task of ICA, the ideal solution $U(t)=A^{-1}(t)$ thereof cannot actually be obtained. Therefore, the following assumptions are made for the linear instantaneous mixing system: the number of the measurement signals (i.e., the number m of the components) is greater than or equal to the number of the source signals (i.e., the number of the voice sensors and collectors); the source signals are independent to each other at any time; the source signal has at most one Gaussian distribution; and the noise in the measurement signal is small.

When there is a transformation W and U(n)=W[X(n)] are independent to each other, U(n) is an estimation of the signal source. The task of the ICA can be expressed as obtaining the separation matrix $W_p$ i.e., Step 130.

Figure 3:
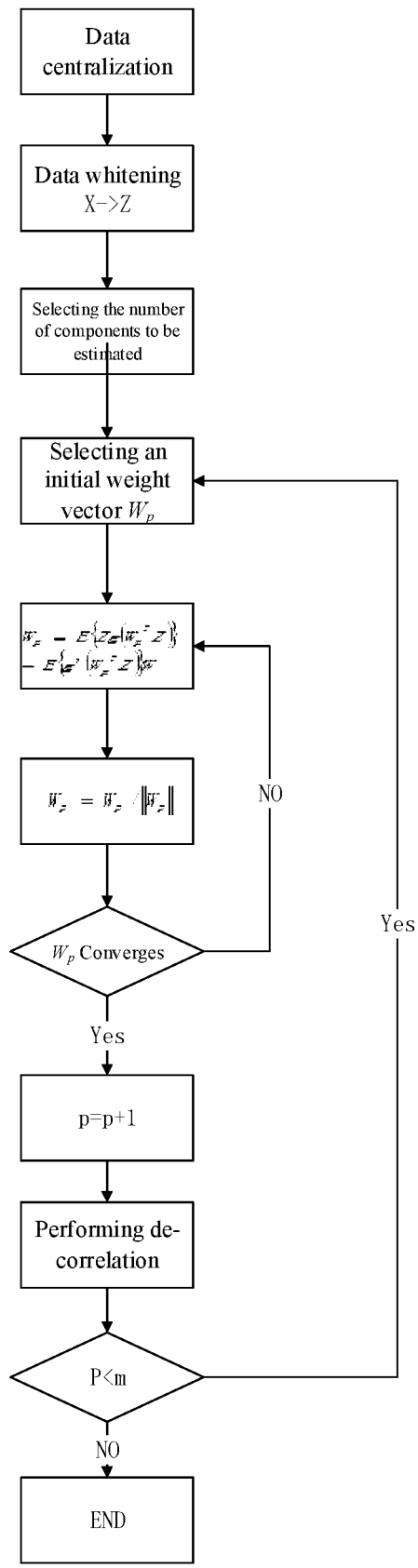
FIG. 3 is a flowchart of the blind signal separation method according to another embodiment of the present application.

The above-mentioned Step 110-Step 130 specifically illustrate the processing steps of the ICA, as shown in FIG. 3:

The determination of processing independence of the ICA can be transformed into the non-Gaussian maximization, which can be divided into two categories: iterative estimation method based on information theory criterion and algebra method based on statistics. In principle, they all utilize the independence and non-Gaussianity of the source signal.

A fast ICA algorithm is employed in the present solution, the steps are as follows:

Step 110 is for performing noise reduction preprocessing on the voice signal so as to reduce the distribution mean value of the multi-source voice messages, especially 0, and also to reduce the correlation of the multi-source voice messages.

In some embodiments, the objective is usually achieved by data centralization, whitening, etc. It should be noted that, data centralization and whitening are different steps, and the combination of the two is better for data processing. Of course, one of them can also be selected.

Wherein, data centralization: linear offset operation, Y=X−mean(X), wherein X is the input data, mean(X) is the mean value thereof; Y is the centralized data, and the expectation of the mean value thereof is 0.

Whitening: in general, the obtained data is correlated, therefore it is usually required to perform preliminary whitening or spheroidization on the data, since the whitening can remove the correlation between the observed signals, thereby simplifying the subsequent extraction process of the independent components. And, in general, the whitening of data can significantly enhance the convergence of the algorithm.

When a random vector of a zero mean value $Z=(Z_1, \ldots, Z_g)^T$ satisfies $E\{ZZ^T\}=I$, where: I is an unit matrix, this vector is called as a whitening vector. The essence of whitening is de-correlation, which is the same as the objective of the principal component analysis. In the ICA, for a independent source signal of zero mean value $S(t)=[S_1(t) \ldots, S_N(t)]^T$, there is: when $i \neq j$, $E\{S_iS_j\}=E\{S_i\}E\{S_j\}=0$, and the covariance matrix is a unit matrix cov(S)=I, therefore the source signal S(t) is white. For the observing signal Y(t), a linear transformation should be found so that Y(t) is projected into the new subspace and becomes a whitening vector, that is:

$$Z(t)=W_0X(t)$$

Wherein, $W_0$ is a whitening matrix and Z is a whitening vector. The whitening process can be done by principal component analysis.

The whitening matrix $W_0$ can be solved by the prior art, which will not be described herein.

In Step 120, the target function: according to the central limit theorem, signal X consists of many independent components Si (i=1, 2 . . . n), S has limited mean value and variance, and X is closer to a Gaussian distribution than S. That is, the independence of a vector can be measured by non-Gaussianity.

Among all the random variables with equal variances, the entropy of the Gaussian variable is the largest, and the non-Gaussianity can be measured by the negative entropy function. The target function can be defined as a negative entropy function, as shown in formula (2).

$$N_g(Z)=H(Z_{Gauss})-H(Z) \quad (2)$$

In the formula, Z is a whitening vector, $Z_{Gauss}$ is a Gaussian random variable with the same variance as that of Z, and H(.) is a differential entropy of the random variable. $N_g(Z)=0$ when Z is a Gaussian distribution. Since the calculation of differential entropy requires the probability distribution of Z which is unknown, formula (3) is used for approximation:

$$[E\{G(z)\}-E\{G(v)\}]^2 \quad (3)$$

Wherein v is a quasi-Gaussian random variable, G is a non-quadratic function in a certain form, and an even function having a convex property, such as G(u)=1/a log(cos h(az)), is generally selected.

It should be noted that there are many implementing algorithms of the ICA. In some embodiments, the FastICA algorithm based on negative entropy maximization facilitated for embedded implementation is described. In fact, other algorithms can be used, and the various algorithms based on this calculation idea are within the protection scope of the present application.

In Step 130, the process is to find the maximum value of formula (3), which can be solved by Newton iteration. Formula (3) is simplified to formula (4), wherein g is the derivative of G.

$$W_p=E\{Zg(W_p^TZ)\}-E\{g'(W_p^TZ)\} \quad (4)$$

The basic form of one FastICA algorithm is: 1) initialize (such as randomize) vector w; 2) let $W_p=E\{Zg(W_p^TZ)\}-E\{g'(W_p^TZ)\}$; 3) let $W_p=W_p/\|W_p\|$; 4) return to 2) when it is not convergent.

One FastICA algorithm of negative entropy maximization can estimate one independent component. In order to estimate several independent components, several FastICA algorithms are needed to obtain vectors. And in order to prevent these vectors from converging to the same maximum value, it needs to de-correlate the outputs $w_1^T x, \ldots, w_n^T x$ after each iteration.

There is a relatively simple algorithm Gram-Schmidt-like for de-correlation, that is, estimating the independent components one by one, and after estimating p independent components $w_1, \ldots, w_p$, subtracting the pre-estimated projections $w_{p+1}^T wj$, $j=1, \ldots, p$ of p vectors when estimating $w_{p+1}$, then standardizing $w_{p+1}$.

In Step 140 which caters Step 110, deriving the estimated target separation signal U(n) from U(n) WX(n) after deriving the separation matrix $W_p$ wherein X(n) is the vector constructed by the plurality of signal source voice messages.

Hereinafter, a blind signal separation method based on the ICA noise reduction technology is described with a specific embodiment, as shown in FIG. 3:

Step 210, centralizing data;

In this step, data centralization is performed on the detected voice messages.

The formula of the data centralization processing is:

Y=X−mean(X), wherein X is the input data, mean(X) is the mean value of X; Y is the centralized data, and the expectation of the mean value thereof is 0.

Step 220, whitening data so as to whiten X to Z;

The formula of the data whitening processing is: $Z(t)=W_0 X(t)$, wherein $W_0$ is the whitening matrix and Z is the whitening vector.

Step 230, selecting the number m of the components to be considered;

The number of the signal sources is determined based on the existing environmental and hardware conditions. It should be noted that, the number m of the components has to be smaller or equal to the number of the voice sensors (voice collectors).

Step 240, estimating and calculating the separation matrix W;

A one-by-one calculation is used in this step, and the conditions are determined during the step so to determine the different starting modes of big loop and small loop. Step 240 specifically includes: Step 2410, selecting an initial weight vector $W_p$;

The initial weight vector $W_p$ may be determined according to an empirical value. Under the value of each p, the values of the initial weight vectors may be equal, for example, all of them are 0, and may certainly be different in other embodiments.

Step 2420, calculating $W_p$ with $W_p = E\{Zg(W_p^T Z)\} - E\{g'(W_p^T Z)\}$;

Step 2430, determining whether $W_p$ converges with $W_p = W_p / \|W_p\|$ based on the calculated $W_p$;

When $W_p$ converges, the process proceeds to Step 2440; when $W_p$ does not converge, the iterative operation is continued, and the process returns to Step 2420 to start the small loop.

Step 2440, performing de-correlation on $W_p$;

In some embodiments, Gram-Schmidt-like can be used for de-correlation. After estimating p vectors $W_1, W_2, W_3, W_4, \ldots W_{p-1}$, subtracting the projections $W_p^T W_j$, $j=1, \ldots p-1$, of p−1 vectors when estimating $W_p$, then standardizing $W_p$.

The evaluation of $W_p$ ends after this step. Then, the process proceeds to the solution loop for the next value, and Step 2450 gives the start instruction to start the next big loop.

Step 2450, letting p=p+1, comparing p with m, when p<m, the process returns to Step 2410; when p≥m, the process ends and the separation matrix W is obtained.

In order to better perform the above-described blind signal separation method, a blind signal separation structure is provided hereinafter. The blind signal separation structure can be loaded with blind signal separation programs, and installed in the existing electrical assemblies, or integrated into the existing voice control systems in a chip manner, or loaded into the existing program hardware as a set of software programs.

In the following text, the structure and internal modules and units will be described. The principles, formulas, algorithms and the like thereof refer to and follow the description above, and are not repeated herein.

At the same time, it should be noted that the modules and units described hereinafter are mostly summarized by functions. The modules can be merged with each other, and can be split, as like as the units.

Figure 4:
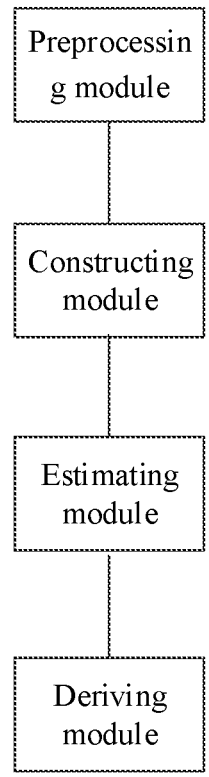
FIG. 4 is a diagram showing the blind signal separation structure according to an embodiment of the present application.

The blind signal separation structure, as shown in FIG. 4, includes:

a preprocessing module, configured to perform noise reduction preprocessing on a detected voice signal, wherein the voice signal is a linear superposition signal of a plurality of simultaneous signal source voice messages;

a constructing module, configured to construct, by means of non-Gaussian measurement, a target function for the preprocessed voice signal;

an estimating module, configured to estimate, by means of an iterative algorithm, an expectation-maximization separation matrix W of the target function; and a deriving module, configured to derive an estimated target separation signal U(n) from U(n)=WX(n), wherein X(n) is a vector constructed by the plurality of signal source voice messages.

Wherein the preprocessing module includes a data centralizing unit configured to perform data centralization. The formula of the data centralization processing is:

Y=X−mean(X), wherein X is the input data, mean(X) is the mean value of X; Y is the centralized data, and the expectation of the mean value thereof is 0.

Wherein the preprocessing module includes a whitening unit configured to perform whitening. The formula of the whitening processing is: $Z(t)=W_0 X(t)$, wherein $W_0$ is the whitening matrix and Z is the whitening vector.

Wherein the estimating module includes:

an estimating unit configured to estimate number m of components to be estimated;

an initializing unit configured to initialize weight vector w;

a calculating unit configured to calculate $W_p$ with $W_p = E\{Zg(W_p^T Z)\} - E\{g'(W_p^T Z)\}$;

a determining unit configured to determine whether $W_p$ converges according to $W_p = W_p / \|W_p\|$; activate a de-correlating unit to de-correlate $W_p$ when $W_p$ converges, and let p=p+1; compare p with m, and return the process to the initializing unit when p<m, and ends the process when p≥m, and the separation matrix W is obtained;

activate the calculating unit when $W_p$ does not converge.

De-correlating $W_p$ by the de-correlating unit includes:

after estimating p vectors $W_1, W_2, W_3, W_4, \ldots W_p$, subtracting the projections $W_{p+1}^T W_j$, $j=1, \ldots p$, of p vectors when estimating $W_{p+1}$, then standardizing $W_{p+1}$.

The blind signal separation structure above is applied to a voice control system which includes a voice detecting assembly and the blind signal separation structure above;

The voice detecting assembly is configured to detect a plurality of signal source voice messages within the environment and obtain voice signals for the blind signal separation structure to perform blind signal separation.

The voice control system above is applied to an electrical appliance assembly which includes an electrical appliance and the voice control system above, wherein the electrical appliance is connected to the voice control system.

The electrical appliance assembly includes all kinds of the electrical automatic control devices that require voice control, such as: any of the home appliances, central air conditioners, and electronic mobile terminals.

The above are only preferred embodiments of the present application, and are not intended to limit the present application. Any modification, equivalent replacement and improvement made within the spirit and principle of the present application shall be within the protection scope of the present application.

What is claimed is:

1. A signal separation method, comprising:
   performing noise reduction preprocessing on a detected voice data to obtain a preprocessed voice data, the voice data being a linear superposition signal of a plurality of voice signals detected simultaneously from a plurality of signal sources;
   constructing, by means of non-Gaussian measurement, a target function for the preprocessed voice data;
   estimating, by means of an iterative algorithm, an expectation-maximization separation matrix W of the target function; and
   deriving an estimated target separation signal U(n) from U(n)=WX(n), wherein X(n) is a vector constructed by the plurality of voice signals,
   wherein the estimating the expectation-maximization separation matrix W includes determining a number m of components to be estimated, the number m being smaller than or equal to a quantity of voice sensors corresponding to the detected voice data.

2. The signal separation method of claim 1, wherein the noise reduction comprises data centralization, wherein a formula of the data centralization is:
   Y=X−mean(X), wherein X is input data, mean(X) is a mean value of X, Y is centralized data, and an expectation of a mean value of Y is 0.

3. The signal separation method of claim 1, wherein the noise reduction comprises whitening, wherein a formula of the whitening is:
   Z(t)=W$_0$X(t), wherein W$_0$ is a whitening matrix and Z is a whitening vector.

4. The signal separation method of claim 1, wherein the target function is a negative entropy function, and a formula of the negative entropy function is:
   N$_g$(Z)=H(Z$_{Gauss}$)−H(Z), wherein Z$_{Gauss}$ is a Gaussian random variable with a same variance as that of Z, H(.) is a differential entropy of the random variable, and N$_g$(Z)=0 when Z is a Gaussian distribution; and
   a probability distribution of Z is $[E\{G(z)\}-E\{G(v)\}]^2$, wherein visa quasi-Gaussian random variable, G is a non-quadratic function of even function with a convex property, wherein $$G(u) = \frac{1}{a}\log(\cosh(az)),$$

and u is a variable.

5. The signal separation method of claim 1, wherein the estimating comprises:
   initializing a weight vector w;

calculating $W_p$ with $W_p=E\{Z_g(W_p^TZ)\}-E\{g'(W_p^TZ)\}$;

determining whether $W_p$ converges with $W_p=W_p$; and
   de-correlating $W_p$ when $W_p$ converges.

6. The signal separation method of claim 5, wherein the de-correlating $W_p$ comprises:
   estimating p vectors $W_1$, $W_2$, $W_3$, $W_4$, ... $W_p$,
   subtracting projections $W_{p+1}^TW_j$, j=1, p of the p vectors when estimating $W_{p+1}$, and
   standardizing $W_{p+1}$.

7. The signal separation method of claim 5, wherein an operation of the estimating routes to the calculating when $W_p$ does not converge.

8. A device for signal separation, comprising:
   a plurality of voice sensors;
   a preprocessing module, configured to perform noise reduction preprocessing on a detected voice data to obtain a preprocessed voice data, wherein the voice data is a linear superposition signal of a plurality of voice signals detected simultaneously from a plurality of signal sources;
   a constructing module, configured to construct, by means of non-Gaussian measurement, a target function for the preprocessed voice data;
   an estimating module, configured to estimate, by means of an iterative algorithm, an expectation-maximization separation matrix W of the target function; and
   a deriving module, configured to derive an estimated target separation signal U(n) from U(n)=WX(n), wherein X(n) is a vector constructed by the plurality of voice signals,
   wherein the estimating module includes an estimation unit that operates to determine a number m of components to be estimated in the expectation-maximization separation matrix W, the number m being smaller than or equal to a quantity of voice sensors of the plurality of voice sensors.

9. The device of claim 8, wherein the preprocessing module comprises a data centralizing unit configured to perform data centralization, a formula of the data centralization being:
   Y=X−mean(X), wherein X is input data, mean(X) is a mean value of X, Y is centralized data, and an expectation of a mean value of Y is 0.

10. The device of claim 8, wherein the preprocessing module comprises a whitening unit configured to perform whitening, a formula of the whitening being: Z(t)=W$_0$X(t), wherein W$_0$ is a whitening matrix and Z is a whitening vector.

11. The device of claim 8, wherein the estimating module comprises:
    an initializing unit configured to initialize a weight vector w;
    a calculating unit configured to calculate $W_p$ with $W_p=E\{Zg(W_p^TZ)\}-E\{g'(W_p^TZ)\}$; and a determining unit configured to:
        determine whether $W_p$ converges according to $W_p=W_p/\|W_p\|$;
        activate a de-correlating unit to de-correlate $W_p$ when $W_p$ converges; and
        activate the calculating unit when $W_p$ does not converge.

12. The device of claim 11, wherein the de-correlating $W_p$ by the de-correlating unit comprises:
  estimating p vectors $W_1, W_2, W_3, W_4, \ldots W_p$,
  subtracting projections $W_{p+1}^T W_j, j=1, p$ of p vectors when estimating $W_{p+1}$, and
  standardizing $W_{p+1}$.

13. An electrical appliance assembly, comprising a voice control system having a voice detecting assembly and a signal separation device;
  wherein the voice detecting assembly is configured to detect a plurality of voice signals from a plurality of signal sources within environment using a plurality of voice sensors and to obtain a voice data containing a linear superposition signal of the plurality of voice signals detected from the plurality of signal sources;
  wherein the signal separation device includes:
    a preprocessing module, configured to perform noise reduction preprocessing on the voice data to obtain a preprocessed voice data;
    a constructing module, configured to construct, by means of non-Gaussian measurement, a target function for the preprocessed voice data;
    an estimating module, configured to estimate, by means of an iterative algorithm, an expectation-maximization separation matrix W of the target function; and
    a deriving module, configured to derive an estimated target separation signal U(n) from U(n)=WX(n), wherein X(n) is a vector constructed by the plurality of voice signals;
    wherein the estimating module includes an estimation unit that operates to determine a number m of components to be estimated, the number m being smaller than or equal to a quantity of voice sensors of the plurality of voice sensors.

14. The electrical appliance assembly of claim 13, further comprising an electrical appliance communicatively connected to the voice control system.

15. The electrical appliance assembly of claim 14, wherein the electrical appliance includes one or more of home appliances, central air conditioners, and electronic mobile terminals.

* * * * *